United States Patent [19]

Ray

[11] 4,383,695
[45] May 17, 1983

[54] BALL PICKER DOLLY

[76] Inventor: Lynn L. Ray, 1434 University Ave., San Diego, Calif. 92103

[21] Appl. No.: 238,912

[22] Filed: Feb. 27, 1981

[51] Int. Cl.³ ............................................. B62B 1/22
[52] U.S. Cl. ............................ 280/47.26; 280/47.18; 248/558
[58] Field of Search ............. 280/47.24, 47.18, 47.19, 280/47.26; 294/19 A; 284/47.26, DIG. 3, DIG. 4, 47.17, 47.34; 220/19; 211/60 G, 86; 248/207, 558

[56] References Cited

U.S. PATENT DOCUMENTS

| 1,015,969 | 1/1912 | McCrary | 280/47.26 |
| 2,639,163 | 5/1953 | Walker | 280/47.26 |
| 2,768,022 | 10/1956 | Pope | 220/19 |
| 3,598,420 | 8/1971 | Edlin | 280/47.24 |

FOREIGN PATENT DOCUMENTS 2410489  8/1979  France ............... 294/19 A

Primary Examiner—David M. Mitchell
Assistant Examiner—Kenneth R. Rice
Attorney, Agent, or Firm—Charmasson, Branscomb & Holz

[57] ABSTRACT

A ball picker dolly for retrieving tennis balls, or the like, comprised of a carriage having a shaft, a horizontal axle orthogonally attached to the lower end of said shaft and means mounted on said axle for motively supporting said carriage on a horizontal surface. Baskets or hoppers of varying configurations and sizes can be secured to the dolly by utilizing adjustable brackets. The various hoppers have gridded bottoms comprising a plurality of filiform members spaced apart to define slot openings dimensioned to admit tennis balls forcibly pushed therethrough. At least one elongated horizontal bracket has spatially disposed pairs of openings thereon and is slidably engageable on the shaft. Ancillary securing means comprise U-shaped prongs dimensioned to pass through spatially disposed openings in the bracket, mating with pairs of openings in either a horizontal or a vertical axis of the bracket. Yet another slidably engageable bracket is provided at the lower end of the shaft which helps support the basket and stabilizes the lower part of a basket to the shaft. Both brackets are tightened down by threaded bolts which pass through the brackets to impinge upon the shaft.

4 Claims, 7 Drawing Figures

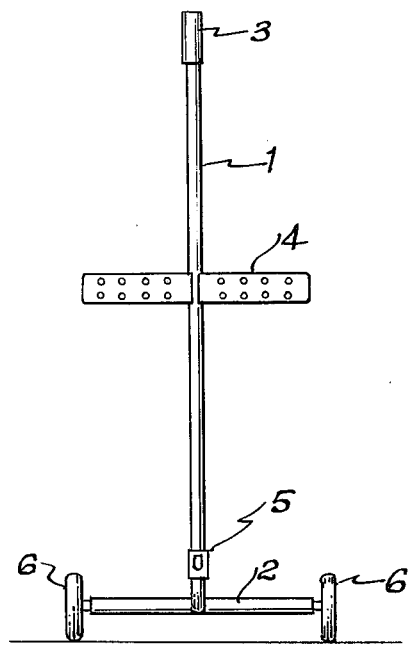
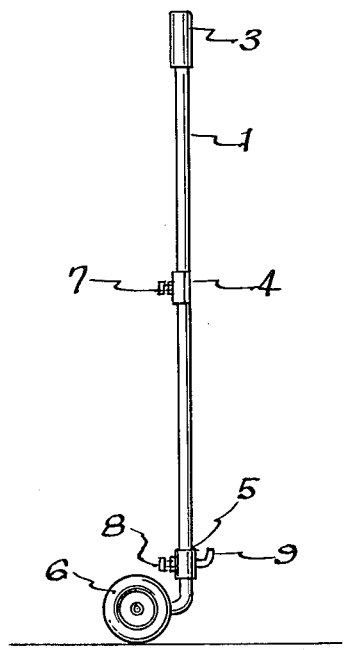
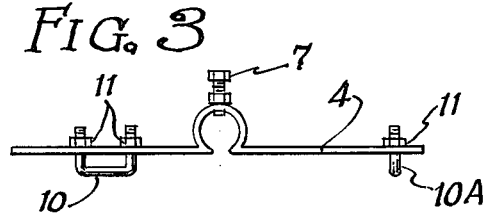
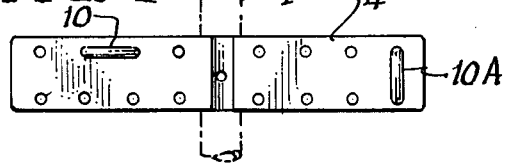
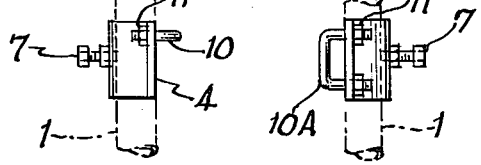
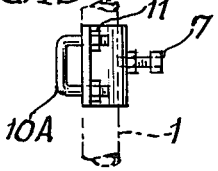
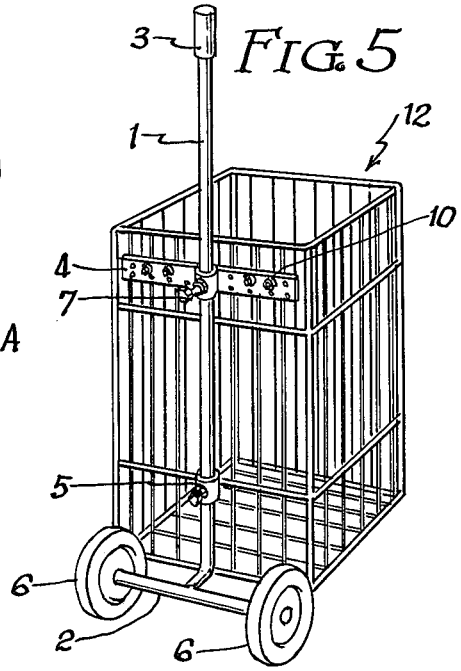

BALL PICKER DOLLY

BACKGROUND AND SUMMARY OF THE INVENTION

A plethora of tennis ball containers are presently known which are basically designed to elevate access to tennis balls and thereby obviate the necessity of the player to bend over to pick up balls. These containers comprise either a wire framework structure (basket or hopper), or an integral unit of basket/hopper and dolly combined. These devices are employed to decrease repeated bending movements of players in combination with articulation of the elbow joint. The movements necessary in tennis ball retrieval exacerbates the common ailment of tennis players known as "tennis elbow", i.e., irritation of the synovial membrane or joint rotary area, of the elbow.

The instant invention is an improvement in the tennis ball container art in that it provides a dolly which accommodates attachment of a variety of containers by virtue of a plurality of adjustment means. This device, when full, allows ready and ample access to tennis balls. It is also capable of picking up the balls themselves, as will be explained. When considering the high number of tennis balls utilized in practice and/or training sessions, the efficiency of labor and physiology is a salient advantage. The instant device accomplishes the foregoing with an inverted T-shaped dolly having wheels mounted on its axle. Baskets are adjustably positioned and secured by an elongated, perforated, horizontal mounting bracket. The perforations are spatially disposed and dimensioned to allow passage of U-shaped prongs therethrough, the "U" capturing a portion of a basket framework and the ends of the prongs passing through the bracket and secured on its backside by threaded nuts. The prongs can be placed in either a vertical or horizontal axis relative to the perforations, or openings, depending upon the configuration of the basket and the optimal location to capture it's wire framework. The bracket itself bears a medial annular protrusion which is dimensioned to capture a substantial part of the shaft. The protrusion formed by this abutting relationship contains a screw bolt which tightens down to secure the bracket on the shaft. The bracket also abuts the framework of the basket, as mentioned above, and two-pronged securing assemblies mate with the respective basket framework and spatially disposed openings.

The basket is pushed along a tennis court or turf area and inclined forward when encountering a tennis ball or tennis balls. The grid on the bottom of the basket is dimensioned to allow passage of balls therethrough upon the application of slight downward thrusting of the dolly. Thus, balls are permitted to accumulate until the basket is filled.

The dolly itself is designed to accommodate a variety of basket sizes and configurations due to the simplicity of the dolly's supporting framework in combination with adjustable and versatile brackets.

BRIEF DESCRIPTION OF THE DRAWINGS

FIG. 1 is a front elevational view of the dolly's supporting framework;

FIG. 2 is a side elevational view of the dolly's supporting framework;

FIG. 3 is a top plan view of an elongated bracket;

FIG. 4 is a detail view of the bracket of FIG. 3;

FIG. 4A is a side view of the structure shown on the left side of FIG. 4;

FIG. 4B is a side view of the structure shown on the right side of FIG. 4; and

FIG. 5 is a perspective view of the dolly secured to a basket.

DETAILED DESCRIPTION OF THE PREFERRED EMBODIMENT

Referring to FIG. 1, the dolly is shown having a shaft 1 terminating in an axle 2. End cap 3 captures the upper end of shaft 1 and is utilized for gripping the dolly. Elongated horizontal bracket 4 is slidably mounted on shaft 1 and secured by a screw bolt passing therethrough to snug up against shaft 1. Yet another slidably mounted bracket 5 is shown lower on shaft 1 and is also secured by a bolt passing therethrough to snug up against shaft 1. Wheels 6 are rotatably mounted on the ends of axle 2.

The side elevational view of FIG. 2 more clearly illustrates the securing means of both brackets 4 and 5 as seen at bolts 7,8 which tighten down on shaft 1, depending upon the desired position necessary to attach a variety of basket configurations to the dolly's shaft. Shaft 1 is integral with axle 2.

Bracket 5 has upturned hook 9 which captures part of the horizontal framework of a basket to lend support and steadiness to the assembly.

FIG. 3 is a detail top elevational view of elongated horizontal bracket 4. The abutting and slidable relationship of bracket 4 around shaft 1, as well as securing of the bracket around the shaft by bolt 7, is shown. U-shaped prong members 10, 10A are dimensioned to capture portions of the wire framework of a basket and mate with spatially disposed pairs of openings (either on a vertical or horizontal axis) in bracket 4 (more clearly illustrated in FIG. 4). The ends of the prongs are threadably engageable with nuts 11 on the backside of bracket 4 and provide attachment means of bracket 4 to a wire basket on the upper part of shaft 1.

Spatial relationship of the openings in bracket 4 is seen in FIG. 4. A horizontal mounting of prong member 10 (side view shown in FIG. 4A) contrasts with vertical mounting of prong members 10A (side view shown in FIG. 4B). Versatility in affixing the prong members to a variety of locations on bracket 4 is emphasized in view of the numerous modes of attachment to different shapes of baskets. This feature, of course, is utilized in cooperation with vertical traversal of bracket 4 on shaft 1 and slidable supporting bracket 5 proximal to axle 2.

The total dolly and basket assembly is shown in FIG. 5. End cap 3 mounts on shaft 1. Bracket 4 is tightened down at bolt 7 onto shaft 1. U-shaped prong members 10, 10A capture wire structure of basket 12. Further down shaft 1, bracket 5 captures horizontal framework of basket 12 with upturned hook 9 (not shown). Cross members 14 in the bottom of basket 12 are spatially dimensioned to allow passage therethrough of tennis balls upon slight application of downward thrusting of the dolly assembly. Maneuverability is achieved by a user holding end cap 3 and tilting the assembly with this leverage to traverse a horizontal surface by moving forward. Tennis balls can therefore accumulate in the basket until full and the assembly can then be placed close to a tennis player for a ready and convenient supply of balls.

While I have described the preferred embodiment of the invention, other embodiments may be devised and different uses may be achieved without departing from the spirit and scope of the appended claims.

What is claimed is:

1. A universal ball picker dolly comprising:
   (a) an upright shaft;
   (b) a wheel assembly mounted to the lower end of said shaft;
   (c) a first horizontally extended bracket adjustably mounted to a central portion of said shaft and having mounting means thereon for releasably and selectably mounting thereto either horizontal or vertical members of a hopper wall when a hopper is engaged on said dolly; and
   (c) a second bracket longitudinally adjustably mounted on said shaft and defining an upturned hook for hooking onto a grid or frame member at the lower portion of a hopper engaged on said dolly.

2. Structure according to claim 1 wherein said first bracket comprises a horizontally extended bar defining a central mounting sleeve which adjustably engages said shaft and a set bolt through said sleeve to lock said bar in one of a plurality of selectable positions on said shaft.

3. Structure according to claim 2 wherein said mounting means comprises a plurality of spaced holes through said bar and at least one U-bolt alternatively engageable through a plurality of pairs of said spaced holes to permit the alternative mounting of a variety of hoppers to said first bracket.

4. Structure according to claim 3 wherein said holes define vertically aligned hole pairs and horizontally aligned hole pairs to permit the engagement of either horizontally extended or vertically extended members of a hopper thereon.

* * * * *